(12) United States Patent
Honjo et al.

(10) Patent No.: US 6,534,024 B2
(45) Date of Patent: Mar. 18, 2003

(54) EXHAUST GAS TREATMENT PROCESS

(75) Inventors: Shintaro Honjo, Hiroshima (JP); Toru Takashina, Hiroshima (JP); Eiji Ochi, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 96 days.

(21) Appl. No.: 09/725,753

(22) Filed: Nov. 30, 2000

(65) Prior Publication Data

US 2001/0007647 A1 Jul. 12, 2001

(30) Foreign Application Priority Data

Dec. 10, 1999 (JP) ............................................. 11-351160

(51) Int. Cl.⁷ ............................................. B01D 47/00
(52) U.S. Cl. ..................................... 423/210; 423/242.1
(58) Field of Search ............................. 423/210, 242.1, 423/243.08

(56) References Cited

FOREIGN PATENT DOCUMENTS

| JP | 63-147519 A | * | 6/1988 | ................. 423/210 |
| JP | 3-56123 A |  | 3/1991 | |
| JP | 4-156920 A |  | 5/1992 | |
| JP | 5-92122 A |  | 4/1993 | |
| JP | 8-257349 A |  | 10/1996 | |
| JP | 10-216476 A |  | 8/1998 | |

\* cited by examiner

Primary Examiner—Stanley S. Silverman
Assistant Examiner—Timothy C. Vanoy
(74) Attorney, Agent, or Firm—Wenderoth, Lind & Ponack, L.L.P.

(57) ABSTRACT

The present invention provides an exhaust gas treatment process wherein exhaust gas containing mercury and sulfur dioxide is subjected to a desulfurization treatment in a desulfurizing absorption tower and then passed through a mist eliminator for removing and recovering mist from the desulfurized exhaust gas, the process including the step of removing mercury from the desulfurized exhaust gas by feeding thereto an oxidizing agent such as sodium hypochlorite and an antioxidant such as methanol unreactive with the oxidizing agent at a position upstream of the aforesaid mist eliminator.

9 Claims, 3 Drawing Sheets

EXHAUST GAS TREATMENT PROCESS

FIELD OF THE INVENTION

This invention relates to a method for the removal of mercury present in exhaust gas, and more particularly to an exhaust gas treatment process which, especially when applied to a system for the desulfurization of exhaust gas discharged in huge amounts, can remove metallic mercury vapor effectively from the exhaust gas.

BACKGROUND OF THE INVENTION

Harmful trace substances such as mercury are present in exhaust gas discharged from coal-fired and oil-fired plants, and it is difficult to remove them by the existing exhaust gas treatment systems. It is believed that mercury is present in exhaust gas, primarily in the form of metallic mercury (Hg) and mercury chloride ($HgCl_2$). Since $HgCl_2$ is easily absorbed into water, it can be removed in a desulfurizing absorption tower or the like. However, metallic mercury (Hg) having vary low solubility in water is, not absorbed in the desulfurizing absorption tower and may be discharged from a stack as metallic mercury vapor. At present, the amount of Hg which may be discharged from a stack is very small and has little influence on the environment. However, it is ideally preferable to eliminate such a risk completely.

To this end, the activated carbon adsorption technique, the sodium hypochlorite absorption technique and the like are being employed as Hg removal techniques.

With respect to the activated carbon adsorption technique, a method wherein a powder of activated carbon is blown into exhaust gas and recovered with a bag filter has already been put to practical use. However, this method is chiefly designed to treat exhaust gas resulting from garbage incineration, and no method suitable for use with a large-volume gas such as exhaust gas from an electric power plant is not known.

With respect to the sodium hypochlorite absorption technique, there are known, for example, methods wherein an additive such as sodium hypochlorite is directly added to cooling water for a cooling tower, an absorbing fluid within a desulfurizing absorption tower, or feed water or circulating water for a wet electrostatic precipitator. However, all of these methods involve the addition of an additive to the main apparatus of an exhaust gas treatment plant, and there is a possibility that the additive may impair their essential functions. For example, since the cooling tower has a low pH, a large amount of an oxidizing agent is required. Moreover, these methods are chiefly designed to treat exhaust gas resulting from garbage incineration, and are not suitable for use with a large-volume gas such as exhaust gas from an electric power plant.

On the other hand, another method for the removal of mercury present in exhaust gas is conceivable. According to this method, a mist eliminator is installed on the downstream side of a desulfurizer, and a solution containing an oxidizing agent (e.g., sodium hypochlorite) is sprayed into exhaust gas at a position upstream of the mist eliminator so as to oxidize the mercury.

However, this method has a problem in that, since an oxidizing agent is added to exhaust gas, the absorption of $SO_2$ causes a large amount of the oxidizing agent to be consumed by reaction with $SO_2$. Consequently, the sprayed oxidizing agent (e.g., sodium hypochlorite) scarcely remains and does not serve to recover mercury effectively, so that it becomes necessary to add sodium hypochlorite in quick succession. Since this causes an increase in the operating cost of the system, the aforesaid method has the disadvantage of being inefficient.

That is, even though sodium hypochlorite or the like is added as an oxidizing agent for the oxidation of mercury, the oxidizing agent fails to exhibit its effect unless it is fed in large amounts. Actually, the absorption of sulfur dioxide ($SO_2$) causes the oxidizing agent to be consumed in an amount equal to or greater than the amount of the existing $SO_2$, thus leading to an increase in operating cost.

SUMMARY OF THE INVENTION

In view of the above-described problems, the present inventors made intensive investigations for the purpose of developing an exhaust gas treatment process which can remove mercury, particularly metallic mercury vapor, from a large-volume gas (e.g., exhaust gas from an electric power plant) and in which the oxidative removal of mercury with the aid of an oxidizing agent can be effectively carried out even in the presence of $SO_2$.

As a result, the present inventors have now found that, by adding a specific antioxidant to a solution of an oxidizing agent, the oxidizing agent can be effectively used for the removal of mercury, and the above-described problems can be solved thereby. The present invention has been completed from this point of view.

Specifically, the mercury removal method of the present invention is characterized in that, in an exhaust gas treatment process wherein exhaust gas containing mercury and sulfur dioxide is subjected to a desulfurization treatment in a desulfurizing absorption tower and then passed through a mist eliminator for removing and recovering mist from the desulfurized exhaust gas, an oxidizing agent and a specific antioxidant unreactive with the oxidizing agent are added to the desulfurized exhaust gas at a position upstream of the aforesaid mist eliminator.

By adding the antioxidant so as to allow the oxidizing agent to act effectively, the mercury-absorbing ability is enhanced and the operating cost is reduced. Moreover, by adding the oxidizing agent to the desulfurized exhaust gas at a position upstream of the mist eliminator, the amount of oxidizing agent fed may be reduced to a level of $1/10$ to $1/20$ as compared with the method in which an oxidizing agent is directly added, for example, to the absorbing fluid within the absorption tower. Furthermore, mercury can be removed from the desulfurized exhaust gas without contaminating other apparatus with the oxidizing agent.

The aforesaid antioxidant preferably comprises an alcohol, and the aforesaid oxidizing agent preferably comprises sodium hypochlorite, sodium chlorate or potassium permanganate.

In the mercury removal method of the present invention, it is a preferred embodiment to feed the aforesaid oxidizing agent and antioxidant to the desulfurized exhaust gas by spraying a solution containing them (i.e., an absorbing solution) into the desulfurized exhaust gas. It is especially preferable that the solution used for this purpose have a pH of 5 to 7.

As the aforesaid mist eliminator, there may be used, for example, a vertically or obliquely installed mist eliminator. Moreover, the aforesaid oxidizing agent and antioxidant may be fed cocurrently or countercurrently to the flow of the aforesaid desulfurized exhaust gas.

When an oxidizing agent is added to exhaust gas to be treated according to the present invention, the oxidation of sulfur dioxide constituting a component other than mercury proceeds. This oxidation reaction of sulfur dioxide (SO$_2$) consists of an absorption reaction, an initiation reaction, a propagation reaction and a termination reaction, and proceeds as a chain reaction in which a radical (.SO$_3$) is formed as an intermediate by the initiation reaction.

Since this radical has very high reactivity, it reacts rapidly with an antioxidant (i.e., a radical scavenger such as an alcohol capable of capturing radicals) added according to the present invention. Consequently, the oxidation reaction of sulfur dioxide can be stopped by reacting the exhaust gas with the radical scavenger prior to its reaction with the oxidizing agent such as hypochlorous acid.

Thus, the present invention enables an oxidizing agent to act effectively by the addition of an antioxidant, so that the mercury-absorbing ability can be enhanced and the operating cost of the system can be reduced. Moreover, the reduction in pH of an absorbing solution (i.e., a solution of the oxidizing agent) due to the absorption of sulfur dioxide is suppressed, so that material corrosion can be reduced and an adverse influence on the materials of piping and downstream equipment can be avoided.

The present invention is more fully described hereinbelow in connection with several specific embodiments thereof. However, it is to be understood that the present invention is not limited to these specific embodiments.

Figure 1:
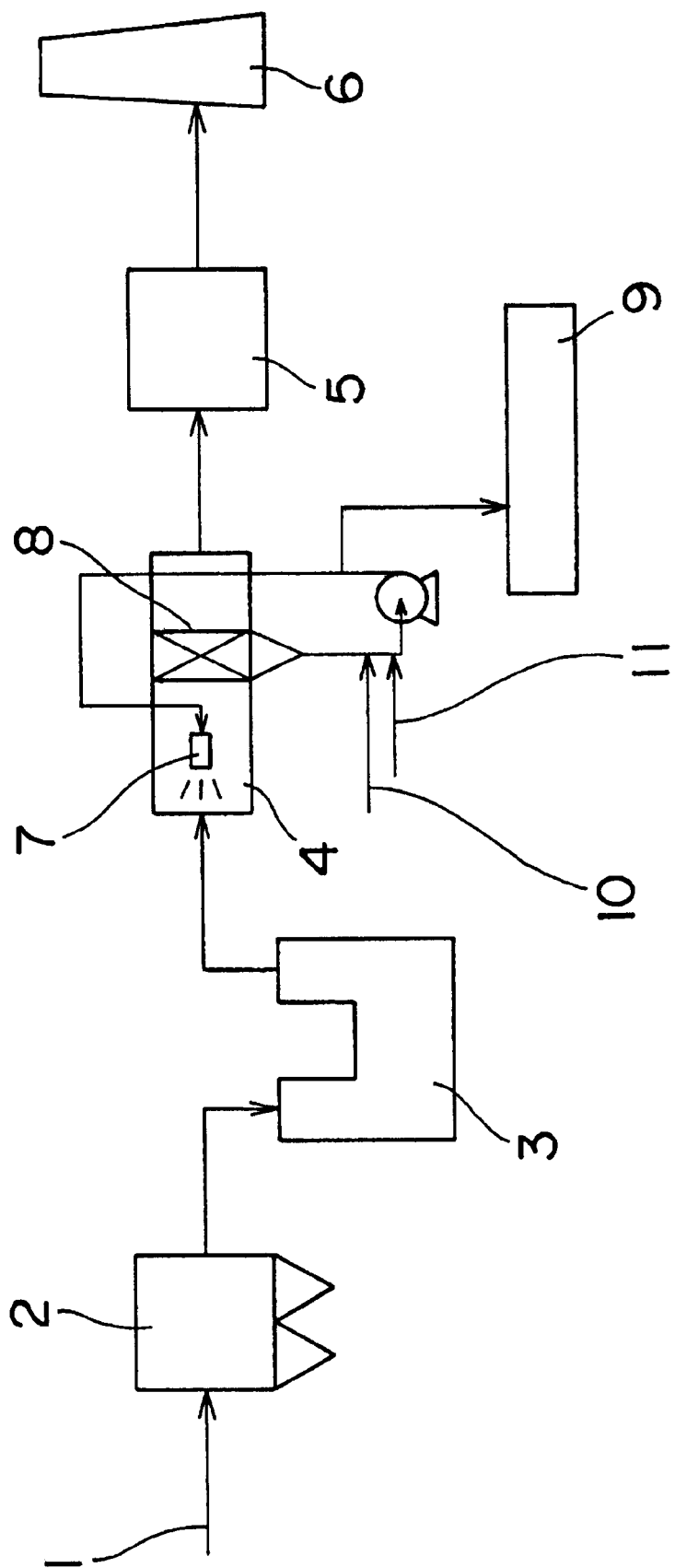
FIG. 1 is a flow diagram for explaining the mercury removal method of the present invention as embodied in an exhaust gas treatment system.

In the above figures, reference numeral 1 designates exhaust gas; 2, a dust collector; 3, a desulfurizing absorption tower; 4, a duct, 5, a reheater; 6, a stack; 7, a nozzle; 8, a mist eliminator; 9, waste water treatment equipment; 10, an oxidizing agent; 11, an antioxidant; and 12, an absorbing solution.

DETAILED DESCRIPTION OF THE INVENTION

In the mercury removal method of the present invention, an antioxidant, together with an oxidizing agent, is added to exhaust gas at a position downstream of a desulfurizing absorption tower and before a mist eliminator. Thus, the antioxidant captures radicals formed by the oxidation reaction of SO$_2$ taking place in an absorbing solution, and thereby enables the oxidizing agent to act effectively on metallic mercury. The oxidation reaction of sulfur dioxide is believed to consist of the following elementary reactions proceeding in sequence.

  (1)

  (2)

  (3)

-continued

  (3')

  (4)

  (4')

In these equations, $M^{n+}$ represents a metallic ion, and "." represents a radical.

The above equation (1) represents an absorption reaction in which sulfur dioxide is absorbed into water to form a sulfite ion. The above equation (2) represents an initiation reaction for chain reactions, in which a catalyst comprising a metallic ion ($M^{n+}$) reacts with the sulfite ion so as to cause the sulfite ion to be deprived of an electron by the metallic ion and converted into a radical. This initiation reaction is a rate-determining step in the oxidation process of sulfur dioxide.

The above equations (3) and (3') represent propagation reactions (chain reactions) in which the resulting radical reacts with oxygen to form other radicals successively. The above equations (4) and (4') represent termination reactions in which the chain reactions stop with the formation of $SO_4^{2-}$.

In the above-described oxidation reaction of sulfur dioxide, the radical (.SO$_3^-$) formed in the initiation reaction (2) and the radicals (.SO$_3^-$, .SO$_5^-$) formed in the propagation reactions (3) and (3') are all captured by the antioxidant. This capture of radicals causes the oxidation reaction of sulfur dioxide to be stopped.

In order to prevent the oxidizing agent from being consumed by the absorption of sulfur dioxide into the absorbing solution, the antioxidant used in the present invention reacts instantaneously with the radical species formed during the oxidation of sulfite ions (HSO$_3^-$, SO$_3^{2-}$, etc.) and thereby acts as a radical scavenger for stopping the oxidation reaction.

Specific embodiments of the treatment method in accordance with the present invention are described hereinbelow with reference to the accompanying drawings. FIG. 1 illustrates an exemplary exhaust gas treatment system employing the mercury removal method of the present invention.

As illustrated in FIG. 1, a large volume of exhaust gas 1 discharged from an electric power plant is dedusted in a dust collector 2, and then introduced into a desulfurizing absorption tower 3 by way of a heat exchanger (GGH; not shown). No particular limitation is placed on the type of the dust collector 2, and there may be used any dust collector that can collect dust roughly from the exhaust gas 1 prior to its introduction into the desulfurizing absorption tower 3. Similarly, no particular limitation is placed on the type of the desulfurizing absorption tower 3, and there may be used a two-tower type or other desulfurizer which is commonly used in the treatment of exhaust gas.

On the downstream side of the heat exchanger for heat recovery purposes, the exhaust gas 1 comes into contact with a circulating fluid (i.e., a lime slurry or the like) in the desulfurizing absorption tower 3, so that SO$_x$ is removed by absorption into the circulating fluid. Moreover, among various forms of mercury contained in the exhaust gas 1, mercury chloride (HgCl$_2$) is dissolved in the aforesaid circulating fluid and thereby removed. However, metallic mercury (Hg) is not removed by the circulating fluid because of its low solubility in water. As a result, metallic mercury is contained in the desulfurized exhaust gas as Hg vapor and passes through the desulfurizing absorption tower 3. Subsequently, the exhaust gas containing Hg vapor is introduced into a horizontal duct 4.

In the horizontal duct 4, an oxidizing agent 10 and an antioxidant 11 are first fed into the desulfurized exhaust gas. In this step, the aforesaid oxidizing agent and antioxidant are preferably fed by forming them into a solution (i.e., an absorbing solution) and spraying this solution into the desulfurized exhaust gas.

The oxidizing agent 10 used in the present invention comprises one compound, or a mixture of two or more compounds, selected, for example, from among sodium hypochlorite, sodium chlorate, potassium permanganate, copper chloride, manganese chloride, iron chloride, hydrogen peroxide, chelating agents, activated carbon, activated coke, sulfur, alumina, silica, aluminum silicate, iron sulfide, lead sulfide, calcium chloride and coal ash. Most preferably, the oxidizing agent 10 comprises sodium hypochlorite.

On the other hand, the antioxidant used in the present invention needs to meet the following requirements.

Specifically, it is required that the antioxidant does not react with the oxidizing agent (e.g., NaClO) contained in the absorbing solution, is easily soluble in water, does not change the pH of the absorbing solution significantly, does not have strong toxicity, can be easily treated in waste water treatment equipment, and is cheap and readily available.

Any of the antioxidants which meet the above-described requirements may preferably be used in the present invention. Specific examples of these antioxidants include alcohols (e.g., methanol, ethanol, propanol and isopropanol), ketones (e.g., acetone and methyl ethyl ketone), aldehydes (e.g., formaldehyde and acetaldehyde), carboxylic acids (e.g., formic acid, acetic acid and oxalic acid), phenols (e.g., phenol) and ethers, as well as polyols (e.g., diols and glycols), quinones, fatty acids, saccharides, amines, aminoalcohols, iodine and carbon black. Among these compounds, alcohols such as methanol, ethanol, propanol and isopropanol; ketones such as acetone and methyl ethyl ketone; carboxylic acids such as formic acid, acetic acid and oxalic acid; polyols such as glycols; and carbon black are preferred. Especially preferred are alcohols such as methanol, ethanol, propanol and isopropanol.

The addition of an antioxidant as described above enables an oxidizing agent such as sodium hypochlorite to function effectively in oxidizing metallic mercury and removing it as water-soluble mercury chloride.

For example, when sodium hypochlorite (NaClO) is used as the oxidizing agent, the predominant reaction for the removal of mercury is represented by the following equation (5).

$$ClO^- + 2H^+ + Hg \rightarrow Cl^- + Hg^{2+} + H_2O \quad (5)$$

If sulfur dioxide ($SO_2$) coexists, $HSO_3^-$ and the like are formed according to the following equation (6).

$$SO_2 + H_2O \rightarrow HSO_3^- + H^+ \quad (6)$$

Moreover, radicals are formed according to the above equations (2), (3), etc. These components formed from sulfur dioxide will consume $ClO^-$ that can convert metallic mercury into a water-soluble ion. Accordingly, the formation of components reactive with hypochlorite ion in the presence of sulfur dioxide is suppressed by the addition of an antioxidant such as an alcohol. Consequently, the oxidation of metallic mercury as represented by the above equation (5) proceeds so effectively that metallic mercury is removed as water-soluble mercury chloride.

No particular limitation is placed on the method for feeding the oxidizing agent 10 and the antioxidant 11 to the desulfurized exhaust gas, so long as the method permits these components to diffuse fully through the desulfurized exhaust gas. For example, as illustrated in FIG. 1, the aforesaid oxidizing agent 10 and antioxidant 11 may be fed by forming them into a solution and spraying this solution continuously into the desulfurized exhaust gas through a nozzle 7 or the like. When the oxidizing agent and the antioxidant are fed in the form of a solution, it is usual practice to provide a storage tank for an oxidizing agent solution (or an absorbing solution) prior to its feeding and adjust its concentration and pH therein. The antioxidant 11 is also added to this storage tank for the absorbing solution, wherein it is mixed with the absorbing solution and its concentration is adjusted.

Although no particular limitation is placed on the direction in which the solution is sprayed from the nozzle 7, it is sprayed cocurrently or countercurrently to the flow of exhaust gas. Preferably, the solution is sprayed countercurrently to the flow of exhaust gas as illustrated in FIG. 1. Owing to the sprayed solution, Hg present in the desulfurized exhaust gas is oxidized and converted into a form easily soluble in water (e.g., $HgCl_2$), and a mist (of liquid droplets) having a particle diameter of several hundred micrometers is formed.

The feed rate of the oxidizing agent 10 is designated by L/G (in $l/m^3$) in which L is the volume (in l/h) of the absorbing solution and G is the flow rate (in $m^3/h$) of the desulfurized exhaust gas. The aforesaid feed rate of the oxidizing agent 10 is preferably in the range of 0.01 to 1.0 [$l/m^3$] and more preferably 0.01 to 0.05 [$l/m^3$]. If the feed rate is less than 0.01 [$l/m^3$], the oxidizing agent 10 will fail to diffuse fully through the exhaust gas, resulting in a lower degree of mercury removal. If the feed rate is greater than 1.0 [$l/m^3$], this is impractical because an increase in feed rate will bring about no further enhancement in the degree of mercury removal. According to the present invention, the feed rate of the oxidizing agent 10 can be reduced to a level of about 1/10 to 1/20 as compared with the conventional mercury removal method in which an oxidizing agent is directly added to the absorbing fluid within the desulfurizing absorbing tower. Thus, the mercury removal method of the present invention has many advantages from the viewpoint of cost and equipment.

The oxidizing agent concentration of the absorbing solution prepared in the aforesaid storage tank or the like is preferably in the range of 0.001 to 0.1 mol/liter and more preferably 0.01 to 0.05 mol/liter. If the concentration is less than 0.001 mol/liter, the volume of solution required to feed the necessary amount of the oxidizing agent will be increased to cause a reduction in efficiency. If the concentration is greater than 0.1 mol/liter, this is impractical because an increase in feed rate will bring about no further enhancement in the degree of mercury removal.

On the other hand, the antioxidant is also added to and mixed with the absorbing solution in the storage tank. The antioxidant is added in such a proportion as to give a concentration which is about 1/10 to 1/100 of the concentration of the oxidizing agent.

The pH of the absorbing solution containing the oxidizing agent is preferably in the range of 5 to 9 and more preferably 5 to 7. If the pH is less than 5, the acidity of the absorbing solution is so strong that the oxidizing agent will undesirably be liable to decomposition. If the pH is greater than 9, the degree of mercury removal will undesirably be reduced.

When the absorbing solution is sprayed, Hg present in the desulfurized exhaust gas is oxidized and thereby converted into a form easily soluble in water (e.g., $HgCl_2$). Even if sulfur dioxide exists in the exhaust gas, the consumption of the oxidizing agent is avoided owing to the radical-capturing effect of the antioxidant. Consequently, the sprayed oxidizing agent acts effectively on metallic mercury and can hence convert it efficiently into water-soluble mercury chloride or the like. Hg and $SO_2$ are contained in a mist formed by spraying and having a particle diameter of several hundred micrometers.

The aforesaid mist is separated and collected from the desulfurized exhaust gas by means of a high-efficiency mist eliminator 8 within the horizontal duct 4. In the mist eliminator 8, a plurality of doglegged plates are successively arranged at intervals of 30 to 45 mm. When the exhaust gas 1 is made to pass through the spaces therebetween, the mist becomes attached to the plates and is thereby removed from the exhaust gas. The attached mist flows downward along the plates and is recovered. No particular limitation is placed on the type of the mist eliminator 8, so long as it is a high-efficiency mist eliminator which can generally remove even a mist having a particle diameter of about 10 to 20 micrometers.

Accordingly, the Hg- and $SO_2$-containing mist having a particle diameter of several hundred micrometers can be surely collected by means of the mist eliminator 8.

Although a single mist eliminator 8 may be used, two or more mist eliminators arranged in series may also be used. For example, it is preferable to install two or three mist eliminators in series. In some type of equipment, the mist eliminator 8 itself is provided with a spray nozzle for washing purposes immediately before the plates, and it is also possible to spray the aforesaid absorbing solution by utilizing this spray nozzle.

In this embodiment, the oxidizing agent 10 is fed at a position upstream of the mist eliminator 8 and is surely collected by means of the mist eliminator 8, so that the desulfurizing absorption tower 3 installed upstream of the duct 4 and the heat exchanger 5 installed downstream thereof will not be contaminated with the oxidizing agent 10. Thus, this embodiment has the advantage that there is no risk of impairing the inherent functions of other apparatus.

As illustrated in FIG. 1, the desulfurized exhaust gas flow through the duct 4 in a horizontal direction, and the mist is collected by means of a vertically installed mist eliminator 8. However, it is to be understood that the present invention is not limited to the use of the vertically installed mist eliminator.

The exhaust gas which has been freed of Hg by means of the high-efficiency mist eliminator 8 is introduced into a reheater 5, wherein it is reheated by heat exchange with the exhaust gas upstream of the desulfurizer or a heating medium used for the recovery of heat from the exhaust gas upstream of the desulfurizer, in order primarily to prevent the exhaust gas from producing white smoke. Thereafter, the exhaust gas is discharged from a stack 6.

On the other hand, the collected mist may be reused by replenishing it with the oxidizing agent 10 and the antioxidant 11, circulating the regenerated absorbing solution again to the nozzle 7, and spraying it into the desulfurized exhaust gas.

Thus, in the method for removing mercury from exhaust gas in accordance with the present invention, an oxidizing agent and an antioxidant are sprayed into the desulfurized exhaust gas at a position upstream of a mist eliminator, so that the removal of metallic mercury vapor can be achieved in low-cost equipment as compared with a method in which they are directly added, for example, to the absorbing fluid within the absorption tower.

Moreover, the present invention also makes it possible to remove harmful trace substances other than metallic mercury can from exhaust gas, provided that they are substances (e.g., arsenic and selenium) which are present in an undissolved state in the exhaust gas and show an increase in solubility when oxidized.

In the form of system as illustrated in FIG. 1, the collected solution containing the antioxidant may be treated together with other waste water. In another form of system in which the method of the present invention may be employed, it is possible that the collected solution (or treating solution) is recovered at a position downstream of the mist eliminator 8 and returned to the desulfurizing absorption tower 3. In this system, it is undesirable to mix the collected solution with the fluid within the desulfurizing absorption tower 3.

The reason for this is that, in the present invention, not only an oxidizing agent (e.g., sodium hypochlorite) is added in order to remove mercury, but also an antioxidant is added in order to stop the oxidation process of sulfur dioxide halfway. Consequently, the absorbing solution being fed contains the antioxidant. In contrast, the step of oxidizing sulfur dioxide is carried out in the desulfurizing absorption tower 3.

Accordingly, the absorbing solution collected from the mist eliminator 8 must be conducted through a line entirely separate from the supply line to the desulfurizing absorption tower 3, and subjected directly to a waste water treatment. That is, since it is undesirable to add an oxidation-inhibiting substance to the desulfurizing absorption tower 3, it is necessary to avoid introducing the antioxidant into the desulfurizing absorption tower 3. Thus, in the system in which the collected solution is returned to the desulfurizing absorption tower, the solution collected after the addition of the antioxidant must be separately subjected to a waste water treatment.

As described above, the present invention enables an oxidizing agent to act very effectively by the addition of an antioxidant, and brings about an enhancement in mercury-absorbing ability even if the oxidizing agent is used in small amounts. Consequently, mercury (in particular, metallic mercury vapor) contained in a large-volume gas such as exhaust gas from an electric power plant can be removed effectively to cause a marked reduction in the operating cost for the treatment of exhaust gas.

Moreover, the reduction in pH (to a pH of about 1) of an absorbing solution due to the absorption of sulfur dioxide is suppressed, so that material corrosion due to the formation of sulfuric acid can be reduced and an adverse influence on the materials of piping and the like can be avoided.

In order to ascertain the effect of the addition of an antioxidant in the present invention, the following experiments were carried out. However, these examples are not to be construed to limit the scope of the invention.

EXAMPLES

Example 1 and Comparative Example 1

Figure 2:
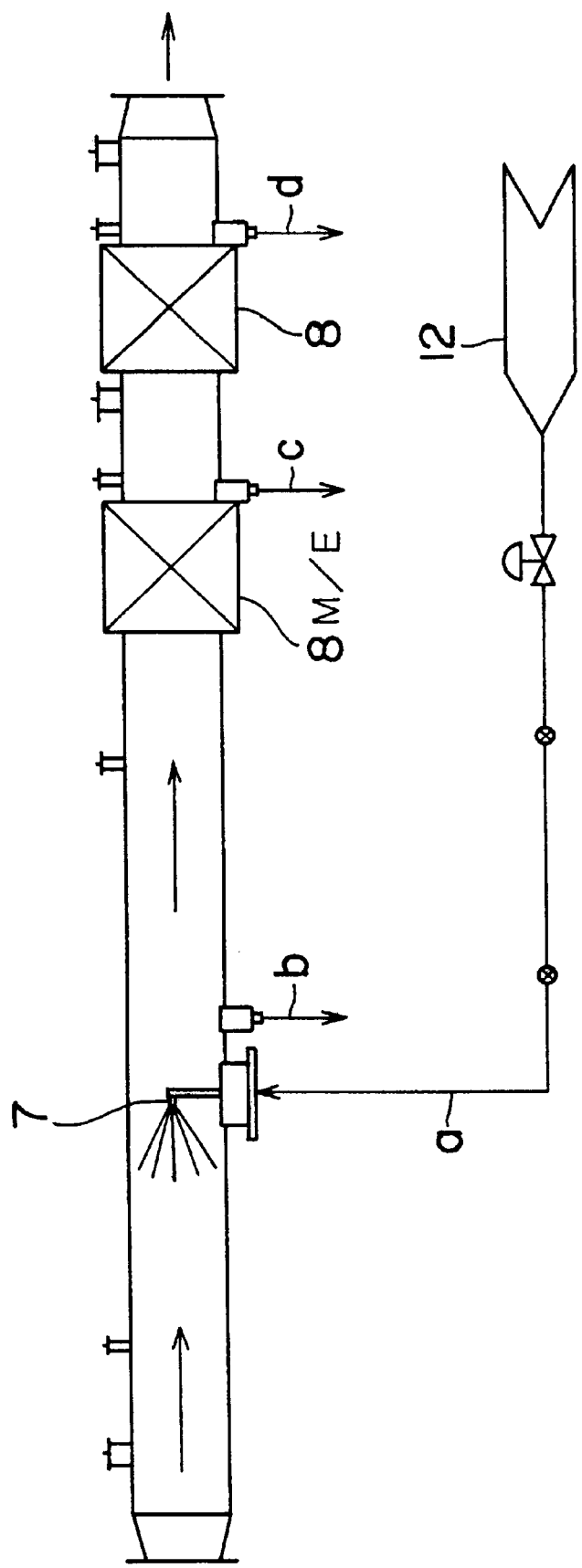
FIG. 2 is a schematic view illustrating the construction of a mist eliminator testing apparatus of an absorbing solution spray type which was used in the Examples as will be described later.

FIG. 2 illustrates the construction of a mist eliminator testing apparatus of an absorbing solution spray type which was used in these Examples.

The aforesaid L/G was 0.03 $l/m^3$, the $SO_2$ content was 20 ppm, the oxidizing agent was 100 mmol/l of sodium hypochlorite (NaOCl), Ug (flow velocity) was 5 m/s, and the gas temperature was 50° C. As an antioxidant, an alcohol (methanol) was added to and mixed with an absorbing solution 12 so as to give a concentration of 10 mmol/l (Example 1). The resulting absorbing solution had a pH of 7. For comparative purposes, an absorbing solution 12 containing no antioxidant was also prepared (Comparative Example 1).

In this testing apparatus, a spray nozzle 7 was installed in an upstream section, and a first mist eliminator (M/E) 8 and a second mist eliminator (M/E) 8 were installed on the downstream side thereof. In operation, inlet or outlet ports (a)–(d) were used in such a way that the absorbing solution was fed at (a), the drain produced immediately thereafter is withdrawn at (b), the solution collected after the first M/E is withdrawn at (c), and the solution collected after the second M/E is withdrawn at (d). Samples were taken from these solutions (a)–(d), and the percentage of residual oxidizing agent (sodium hypochlorite) in each sample was determined.

Figure 3:
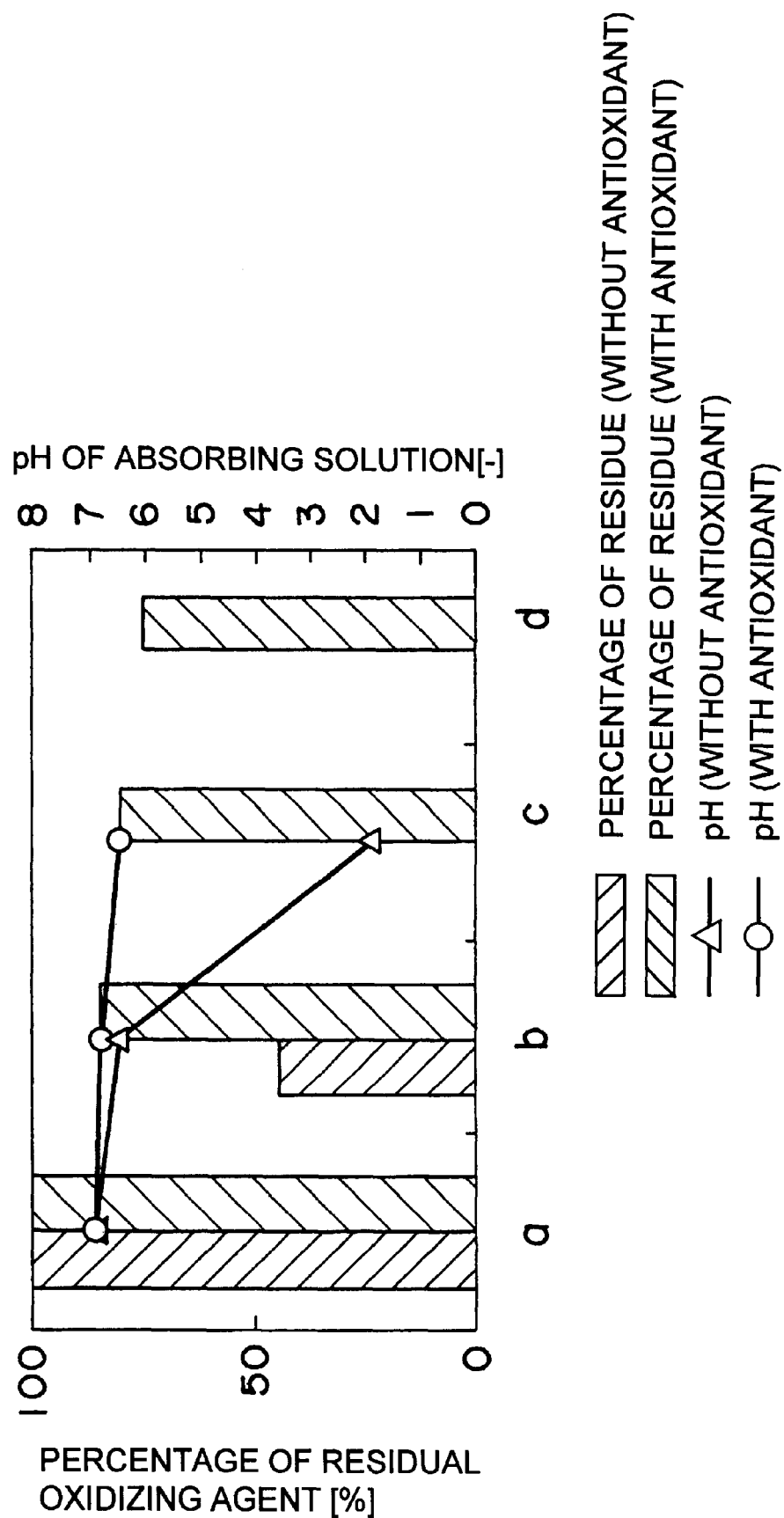
FIG. 3 is a chart showing the test results obtained in the Examples with respect to the percentage of residual oxidizing agent in the absorbing solution and the pH thereof.

The results thus obtained are shown in FIG. 3.

From these results, it can be seen that, in Comparative Example 1, the absorbing solution absorbed sulfur dioxide and hence showed a substantial decrease in the amount of oxidizing agent even immediately after spraying. Similarly, its pH also showed a marked reduction. In contrast, it can be seen that, in Example 1 involving the addition of an antioxidant, much of the oxidizing agent remained without being consumed and, moreover, the reduction in pH was suppressed.

While the present invention has been described with reference to several preferred embodiments and specific examples, they are provided in order to facilitate the understanding of the present invention and are not intended to limit the scope of the invention.

That which is claimed is:

1. An exhaust gas treatment process wherein exhaust gas containing mercury and sulfur dioxide is subjected to a desulfurization treatment in a desulfurizing absorption tower and then passed through a mist eliminator for removing and recovering mist from the desulfurized exhaust gas, the process including the step or removing mercury from the desulfurized exhaust gas by feeding thereto, at the same time, an oxidizing agent and an antioxidant unreactive with the oxidizing agent, said antioxidant selected from alcohols, ketones, aldehydes, carboxylic acid, phenols or polyols at a position upstream of said mist eliminator and downstream of the desulfurizing absorption tower.

2. The exhaust gas treatment process as claimed in claim 1 wherein the antioxidant is an alcohol.

3. The exhaust gas treatment process as claimed in claim 1 wherein the oxidizing agent is sodium hypochlorite, sodium chlorate or potassium permanganate.

4. The exhaust gas treatment process as claimed in claim 1 wherein the oxidizing agent and the antioxidant are fed to the desulfurized exhaust gas by spraying a solution containing the oxidizing agent and the antioxidant into the desulfurized exhaust gas.

5. The exhaust gas treatment process as claimed in claim 4 wherein the solution has a pH of 5 to 7.

6. The exhaust gas treatment process as claimed in claim 2 wherein the oxidizing agent and the antioxidant are fed to the desulfurized exhaust gas by spraying a solution containing the oxidizing agent and the antioxidant into the desulfurized exhaust gas.

7. The exhaust gas treatment process as claimed in claim 3 wherein the oxidizing agent and the antioxidant are fed to the desulfurized exhaust gas by spraying a solution containing the oxidizing agent and the antioxidant into the desulfurized exhaust gas.

8. The exhaust gas treatment process as claimed in claim 6 wherein the solution has a pH of 5 to 7.

9. The exhaust gas treatment process as claimed in claim 7 wherein the solution has a pH of 5 to 7.

* * * * *